(12) United States Patent
Doan et al.

(10) Patent No.: US 7,222,910 B1
(45) Date of Patent: May 29, 2007

(54) MULTI-FUNCTION ARMREST FOR AUTOMOTIVE VEHICLE

(75) Inventors: Linh Doan, Belleville, MI (US);
Marcus Oden, Canton, MI (US); John Pinkerton, Canton, MI (US); Lee Ho, Ann Arbor, MI (US); Todd George, Chelsea, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 14 days.

(21) Appl. No.: 11/162,130

(22) Filed: Aug. 30, 2005

(51) Int. Cl.
*B60J 5/00* (2006.01)

(52) U.S. Cl. ............. 296/153; 296/187.05; 296/1.09

(58) Field of Classification Search ............ 296/153, 296/187.05, 1.09; 280/748, 751; 297/411.21, 297/411.45
See application file for complete search history.

(56) References Cited

U.S. PATENT DOCUMENTS

| | | | |
|---|---|---|---|
| 3,400,979 A | 9/1968 | James | |
| 4,783,114 A | 11/1988 | Welch | |
| 4,786,100 A | 11/1988 | Kleemann et al. | |
| 4,869,543 A * | 9/1989 | Grimes | 296/153 |
| 4,919,470 A | 4/1990 | Muller | |
| 5,181,759 A | 1/1993 | Doolittle | |
| 5,290,087 A * | 3/1994 | Spykerman | 296/153 |
| 5,445,430 A | 8/1995 | Nichols | |
| 5,464,272 A * | 11/1995 | Spykerman et al. | 297/227 |
| 5,857,702 A * | 1/1999 | Suga et al. | 280/751 |
| 5,967,594 A * | 10/1999 | Ramanujam | 296/153 |
| 6,568,743 B1 | 5/2003 | Jayasuriya et al. | |
| 6,983,967 B2 * | 1/2006 | Scheidmantal et al. | 296/1.09 |

* cited by examiner

*Primary Examiner*—Dennis H. Pedder
(74) *Attorney, Agent, or Firm*—Gigette M. Bejin; Artz & Artz, PC

(57) ABSTRACT

An interior armrest for an automotive vehicle includes upper and lower horizontal walls and a channel-shaped lateral impact contactor joined to the upper horizontal walls by the means of shear planes. The lateral impact contactor has a number of wedge-shaped vertical interruptions which cooperate with the shear planes to produce a controlled collapse in the event of a lateral impact of an occupant of the vehicle against the armrest.

9 Claims, 3 Drawing Sheets

MULTI-FUNCTION ARMREST FOR AUTOMOTIVE VEHICLE

TECHNICAL FIELD

The present invention relates to a vehicular armrest having the capacity to accommodate a variety of functions, including the mitigation of force imparted to a passenger in the event of a lateral impact against an exterior portion of a vehicle overlying the armrest.

BACKGROUND

For decades, automotive designers have striven to design armrests which mitigate force input to a vehicle occupant in the event of a side impact against a door or other panel of the vehicle having an interior trim including a fixed armrest. U.S. Pat. No. 3,400,979 discloses an armrest in which a honeycombed member formed of metal, paper, or plastics, is filled with a material such as polyurethane-foamed filler material. A problem with the armrest of the '979 patent resides in its excessive weight and cost. U.S. Pat. No. 4,869,543 discloses an armrest having a number of vertical ribs, but lacking vertical rigidity imparted by the horizontal, vertically separated walls of an armrest according to the present invention.

A multi-function armrest according to the present invention solves the problems found in prior art armrests by providing an armrest which has excellent vertical stability and load bearing capability, while offering multi-function capability, as well as the ability to collapse in a controlled manner when impacting the torso of a vehicle occupant seated alongside the armrest, in the event of a lateral impact directed against the vehicle.

SUMMARY

A unitary, multi-function armrest for an automotive vehicle door trim panel includes a manually accessible switch housing segment, a door pull handle housing segment, and an armrest segment. The armrest segment includes an upper horizontal wall attached to a door trim panel, a lower horizontal wall attached to a door trim panel, and a number of generally vertical ribs extending between and joined with the upper horizontal wall and the lower horizontal wall. A generally channel-shaped lateral impact contactor is joined to the upper and lower horizontal walls. This impact contactor is the portion of the inventive armrest which would normally contact a passenger seated next to the armrest, in the event of a laterally directed impact against the vehicle.

The impact contactor has a plurality of vertical interruptions, which are wedged-shaped cutouts extending through the lateral impact contactor. At least one of the wedge-shaped vertical interruptions is oriented such that the apex of the wedge intersects at least one of two shear planes at which the upper and lower horizontal walls are connected to the lateral impact contactor. The present multi-function unit also includes a cover with a foamed-in-place elastomer having a flexible plastics cladding.

According to another aspect of the present invention, a method for managing a laterally directed impact into an armrest installed in an automotive vehicle includes the steps of compressively loading a channel-shaped lateral impact contactor, and shearing at least a portion of the channel-shaped contactor from upper and lower horizontal walls which are mounted to an interior trim panel. Finally, the method further includes allowing the channel-shaped contactor to collapse as a result of continued application of an impact load.

It is an advantage of a multi-function armrest according to the present invention that several functions may be combined in a single unit having sufficient vertically directed force-deflection characteristics to function well as an armrest, while at the same time providing a suitably calibrated surface for contacting the torso of a vehicle occupant in the event of an impact against a door or other panel to which the armrest is fixed.

It is an advantage of the armrest system according to the present invention that the system may be produced economically and at lower weight and cost than known systems.

Other objects, advantages and features of the present invention will be apparent from the following description and appended claims, reference being had to the accompanying drawings forming a part of the specification, wherein reference numerals designate corresponding parts in the several views.

DETAILED DESCRIPTION OF THE PREFERRED EMBODIMENT

Figure 1:
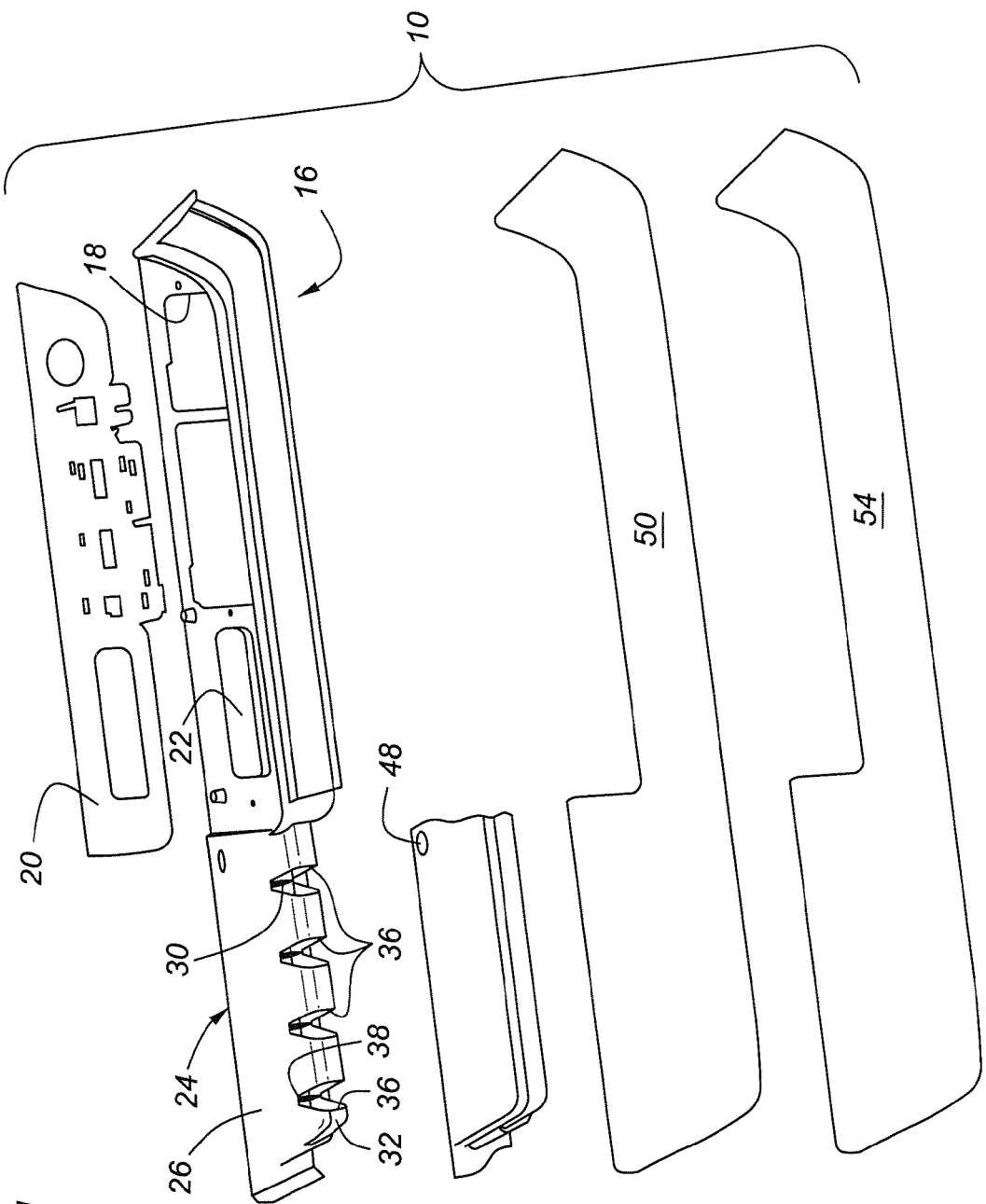
FIG. 1 is an exploded perspective view of a multi-function armrest according to the present invention.

As shown in FIG. 1, a multi-function armrest, 10, for an automotive vehicle according to the present invention includes a number of components, with the core of these being substrate 16, which is preferably molded from a plastics material such as ABS, glass filled nylon, or other types of plastics, or metallic, or non-metallic, or composite materials known to those skilled in the art and suggested by this disclosure. Substrate 16 provides a platform for a number of functions of the present armrest. Thus, manually accessible switch housing segment 18, having bezel 20 is incorporated within armrest 10. Also, door pull handle housing segment 22 allows packaging of an inside door handle within armrest 10. Armrest 10 is covered by foam 50, which is partially confined by tape 48 during the foaming process, to prevent the foam from passing into areas which must be voided according to this design. In turn, foam 50 is covered by plastics cladding 54, which may comprise either vinyl or another type of plastics or other material known to those skilled in the art and suggested by this disclosure. Those skilled in the art will appreciate in view of this disclosure that an armrest according to the present invention could be constructed without the use of foam underlying the exterior cover of the armrest.

Figure 2:
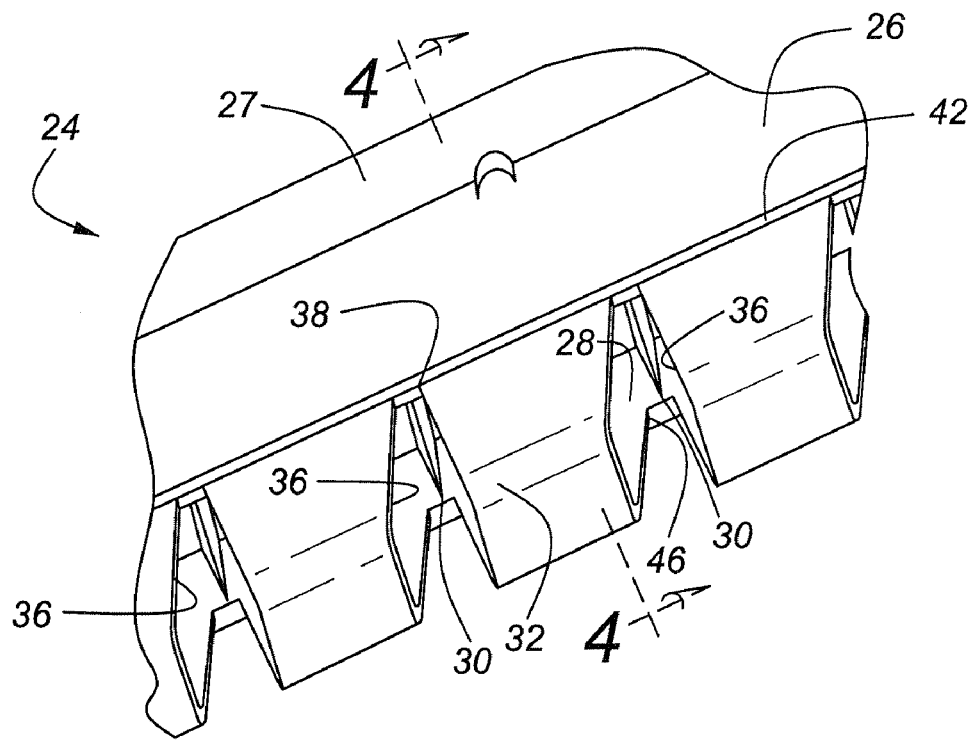
FIG. 2 is a front perspective view of an armrest segment of a unitary multi-function armrest according to the present invention.
Figure 3:
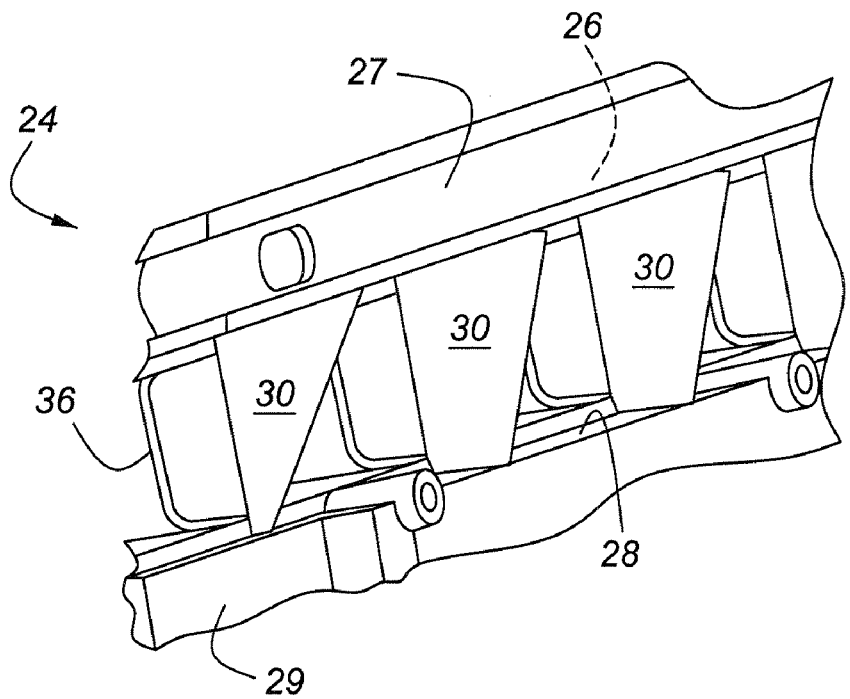
FIG. 3 is a rear perspective view of an armrest segment of the present multi-function armrest.
Figure 4:
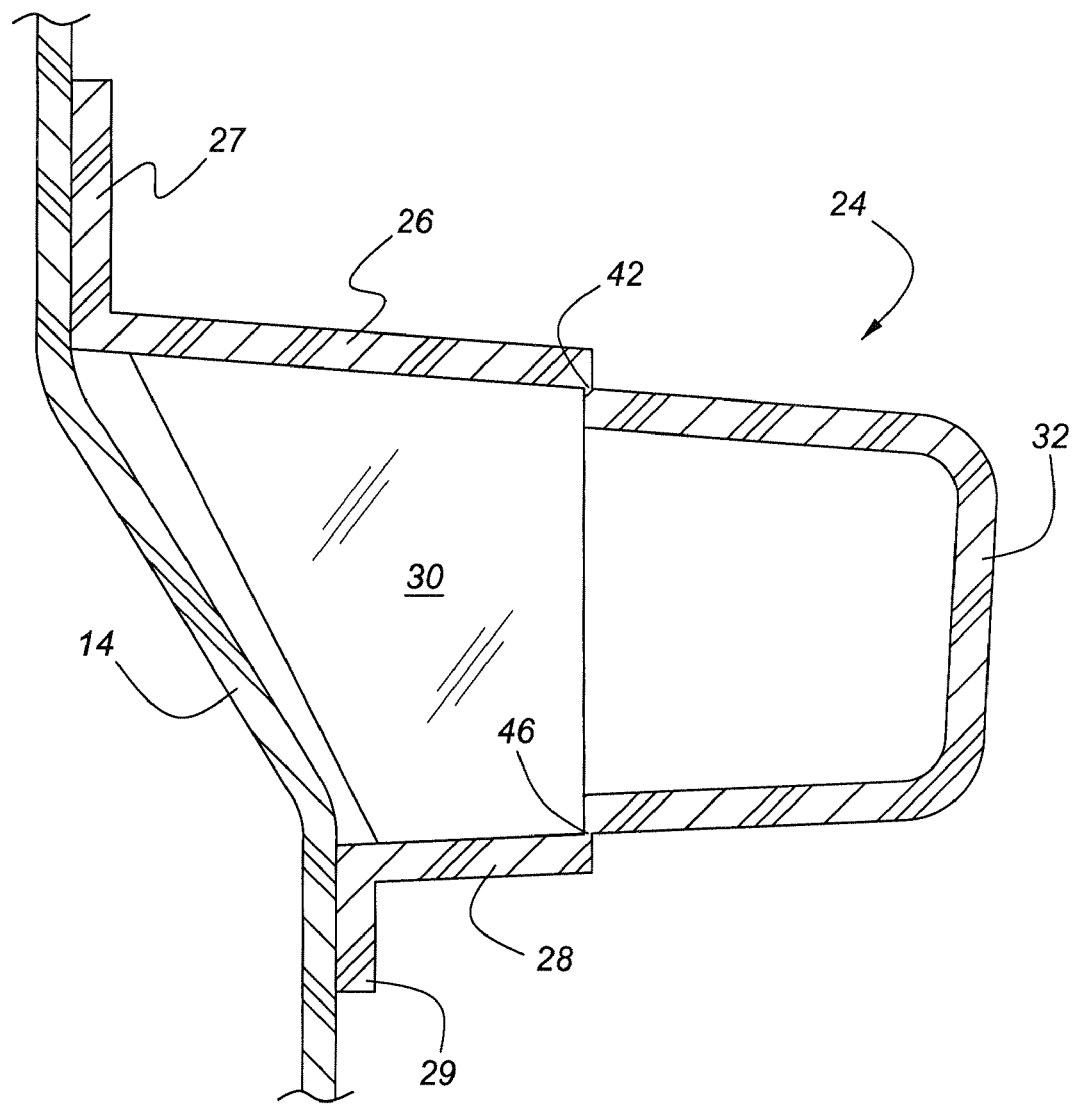
FIG. 4 is a sectional view of the armrest segment as shown in FIGS. 2 and 3, taken along the line 4-4 of FIG. 2.

An energy absorbing function of the present armrest is provided in a specific manner by armrest segment 24, which is shown in FIG. 1, and with greater specificity in FIGS. 2-4. In FIG. 2, segment 24 is shown as having an upper horizontal wail 26, with a flange 27 for attaching horizontal wall portion to door trim panel 14 (FIG. 4). Lower horizontal wall segment 28 has flange 29 for the same purpose. As best shown in FIGS. 3 and 4, a number of ribs 30 extend vertically between upper horizontal wall 26 and lower horizontal wall 28, so as to provide the vertically directed strength necessary for armrest 10.

A series of wedge-shaped cutouts 36 are provided through lateral impact contactor 32. Cutouts 36, as best shown in FIG. 2, extend from the outermost surface of lateral impact contactor 32 to the location of shear planes 42 and 46, which are shown in FIG. 4 with the most precision. Shear planes 42 and 46 mark linear joining zones of lateral impact contactor 32 with upper horizontal wall 26 and the lower horizontal wall 28.

FIGS. 2 and 4 show further that lateral impact contactor 32 is a generally channel-shaped member; this channel shape provides sufficient strength such that during a lateral impact event, lateral impact contactor 32 will shear away from upper horizontal wall 26 and lower horizontal wall 28 along shear planes 42 and 46, and this shearing action will help to induce the lateral collapse of contactor 32, as aided by wedge-shaped cutouts 36.

As noted above, a method according to the present invention for managing a laterally directed impact of an occupant into an armrest installed in an automotive vehicle includes the steps of compressively loading a channel-shaped lateral impact contactor 32, shearing at least a portion of impact contactor 32 from either or both of upper horizontal wall 26 and lower horizontal wall 28, thereby allowing contactor 32 to collapse as a result of continued application of an impact load. In this manner, the application of force to the vehicle occupant may be managed by a unit providing excellent armrest function during normal operation.

While particular embodiments of the invention have been shown and described, numerous variations and alternate embodiments will occur to those skilled in the art. Accordingly, it is intended that the invention be limited only in terms of the appended claims.

What is claimed is:

1. A unitary, multifunction armrest for an automotive vehicle door trim panel, comprising:
   a manually accessible switch housing segment;
   a door pull handle housing segment; and
   an armrest segment, comprising:
      an upper horizontal wall attached to a door trim panel;
      a lower horizontal wall attached to a door trim panel;
      a plurality of generally vertical ribs extending between and joined with said upper horizontal wall and said lower horizontal wall; and
      a generally channel-shaped lateral impact contactor joined to said upper and lower horizontal walls and having a plurality of vertical interruptions.

2. A multifunction unit according to claim 1, wherein said lateral impact contactor and said upper horizontal wall are connected at a first shear plane, and said lower horizontal wall and said lateral impact contactor are connected at a second shear plane.

3. A multifunction unit according to claim 2, wherein said vertical interruptions comprise generally wedge-shaped cutouts extending through said lateral impact contactor, with at least one of said vertical interruptions being oriented such that the apex of said wedge intersects at least one of said shear planes.

4. A multifunction unit according to claim 1, further comprising a foam cover applied to at least said upper horizontal wall and to said impact contactor.

5. An armrest and interior trim for an automotive vehicle, comprising:
   an interior trim panel; and
   an armrest attached to said interior trim panel, with said armrest comprising:
      an upper, generally horizontal wall, attached to and extending laterally from said interior trim panel;
      a lower, generally horizontal wall, attached to and extending laterally from, said interior trim panel;
      a plurality of generally vertical ribs extending between and joined with said upper horizontal wall and said lower horizontal wall; and
      a generally channel-shaped, lateral impact contactor joined to said upper and lower horizontal walls and having a plurality of wedge-shaped vertical interruptions, with the impact contactor being connected at a first generally horizontal shear plane to said upper wall, and at a second shear plane to said lower horizontal wall.

6. A multifunction unit according to claim 2, wherein said wedge-shaped vertical interruptions are oriented such that the apex of each of said wedges intersects at least one of said shear planes.

7. A unitary, multifunction armrest and interior door trim panel for an automotive vehicle, comprising:
   an interior door trim panel; and
   a unitary armrest attached to the interior door trim panel, with said armrest comprising:
      a manually accessible switch housing segment;
      a door release handle housing segment; and
      an armrest segment, comprising:
         an upper generally horizontal wall attached to and extending laterally from a door trim panel;
         a lower horizontal wall attached to and attached to a door trim panel;
         a plurality of generally vertical ribs extending between and joined with said upper horizontal wall and said lower horizontal wall; and
         a generally channel-shaped, convex lateral impact contactor joined to said upper and lower horizontal walls and having a plurality of truncated, wedge-shaped vertical interruptions, with the impact contactor being connected at a first generally horizontal shear plane to said upper wall, and at a second shear plane to said lower horizontal wall.

8. A multifunction unit according to claim 7, wherein said wedge-shaped vertical interruptions are oriented such that the apex of each of said wedges intersects both of said first and second shear planes.

9. A multifunction unit according to claim 7, further comprising a cover with a foamed-in-place elastomer having a flexible plastics cladding.

* * * * *